United States Patent [19]

Stone, deceased et al.

[11] 3,963,258

[45] June 15, 1976

[54] MATERIAL HANDLING VEHICLE

[75] Inventors: Guthrie B. Stone, deceased, late of Honeoye, N.Y., by Alan J. Stone, administrator, Honeoye, N.Y.; Christian T. Tertinek, Canandaigua, N.Y.

[73] Assignee: Stone Construction Equipment, Inc., Honeoye, N.Y.

[22] Filed: June 9, 1975

[21] Appl. No.: 585,234

[52] U.S. Cl. .............................. 280/47.34; 188/29
[51] Int. Cl.² ......................................... B62B 3/02
[58] Field of Search .................. 280/47.34, 47.16; 188/167, 29

[56] References Cited
UNITED STATES PATENTS

| 429,709 | 6/1890 | Wilson | 188/167 |
| 1,810,428 | 6/1931 | Lazzeri | 188/167 X |
| 2,430,629 | 11/1947 | Bigus, Jr. | 188/167 X |
| 3,295,861 | 1/1967 | Lull | 280/47.16 |
| 3,302,757 | 2/1967 | Eagleson, Jr. et al. | 188/167 |

Primary Examiner—M. H. Wood, Jr.
Assistant Examiner—Michael J. Forman
Attorney, Agent, or Firm—Clarence A. O'Brien; Harvey B. Jacobson

[57] ABSTRACT

A material handling vehicle having a deadman brake resiliently suspended from a load receiving receptacle of the vehicle. Brake shoes of the brake normally frictionally engage center wheels of the vehicle and restrain the vehicle from movement. Grasping of a handle of the brakes together with a fixed handle provided on the vehicle cause the brake shoes to disengage from the center wheels and permit free movement of the vehicle.

9 Claims, 3 Drawing Figures

U.S. Patent June 15, 1976 3,963,258

MATERIAL HANDLING VEHICLE

BACKGROUND OF THE INVENTION

1. Field of the Invention

This invention relates generally to material handling vehicles, and particularly to a deadman brake system for manually manipulated material handling vehicles such as mortar carts, and the like.

2. Description of the Prior Art

U.S. Pat. No. 3,295,861, issued Jan. 3, 1967 to LeGrand H. Lull, and No. 3,811,535, issued May 21, 1974 to J. R. Preusser, disclose brakes for material handling vehicles such as those commonly employed to transport mortar, and the like, at a construction site. These known vehicle brakes, however, are primarily intended as parking brakes which are either locked in a brake applied position by manual manipulation of an actuating lever, or are locked in a brake-released position by manipulation of the same lever in a different manner.

It is also known to provide various hand-manipulated carts with brakes that automatically apply when an operator releases the cart. Examples of such known automatically applied brakes may be found in U.S. Pat. No. 429,709, issued June 10, 1890 to W. Wilson, and No. 3,061,049, issued Oct. 30, 1952 to R. K. Bramley. While the braking system of the latter mentioned patent is intended for use with dump carts, and the like, used for transporting mortar about a building construction site, the brake system is specially designed for a certain type of mortar cart and is not readily adaptable to other commonly used mortar carts, such as those shown in the aforementioned Pat. Nos. 3,295,861 and 3,811,535.

SUMMARY OF THE INVENTION

It is an object of the present invention to provide a deadman brake system for use on material handling vehicles having a pair of laterally spaced center wheels and longitudinally spaced swivel, or castor, wheels.

It is another object of the present invention to provide an improved proved automatically applied brake system for material handling carts, and the like, which may be applied from either end of the associated cart.

It is still another object of the present invention to provide an improved automatically applied brake system which retains the compact construction of an associated material handling vehicle.

These and other objects are achieved according to the present invention by providing a brake system having: a substantially rectangular framework arranged about the side and end walls of an associated load receiving receptacle and resiliently supported from the receptacle by a pair of laterally spaced tension springs; a pair of brake shoes mounted on the framework for normally frictionally engaging the center wheels of the associated vehicle, with the springs being anchored in the portions associated with the side walls of the receptacle of a lip which extends around the upper edges of the side walls and end walls of the receptacle, the springs being anchored adjacent a one of the end walls of the receptacle; and with the framework including side rails connected to the brake shoes and forming a shallow V as the side rails extend toward the end walls of the receptacle, cross handles connecting together the side rails of the framework across the end walls of the receptacle so as to be engaged by an operator of the vehicle in cooperation with fixed handles provided on the end walls of the receptacle and release the brake whenever the vehicle is being manipulated by an operator.

These together with other objects and advantages which will become subsequently apparent reside in the details of construction and operation as more fully hereinafter described an claimed, reference being had to the accompanying drawings forming a part hereof, wherein like numerals refer to like parts throughout.

DESCRIPTION OF THE PREFERRED EMBODIMENT

Figure 1:
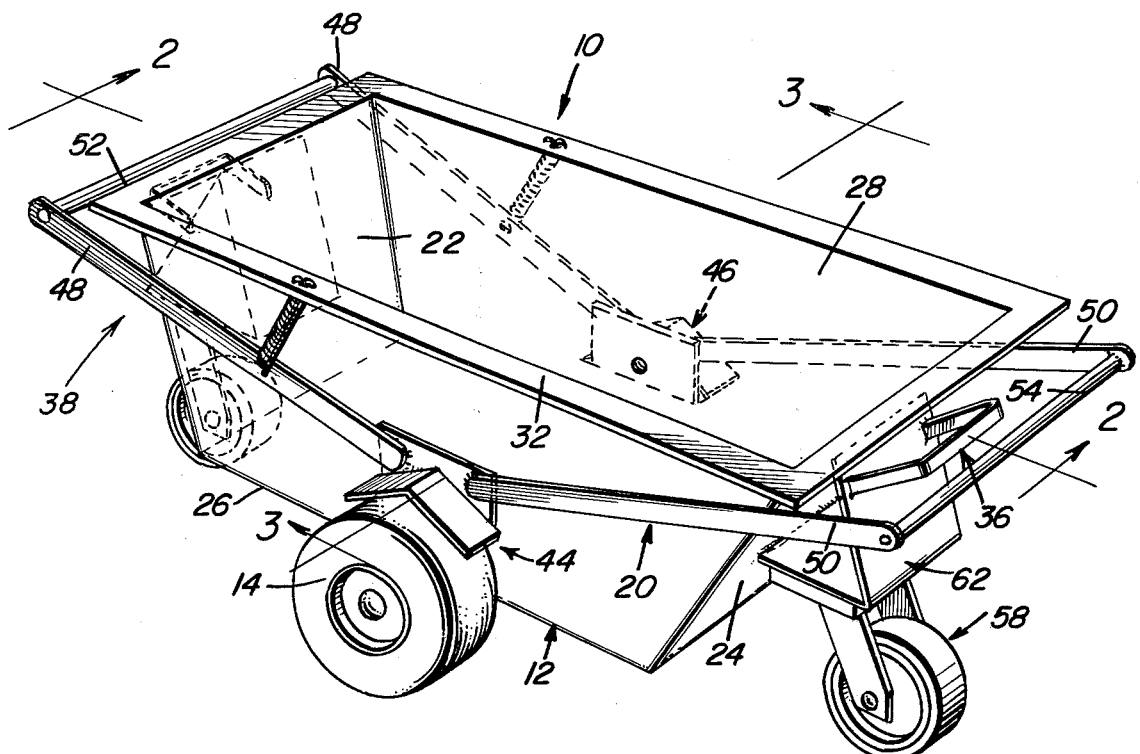
FIG. 1 is a perspective view showing a material handling vehicle provided with a brake system according to the present invention.

Referring now more particularly to the drawings, a material handling vehicle 10 has a load receiving receptacle 12 movably supported by a pair of laterally spaced center wheels 14 and 16 rotatably mounted beneath receptacle 12 as by an axle 18. In this manner, wheels 14, 16 movably support receptacle 12 together with a pair of casters to be described in greater detail below. A deadman brake arrangement 20 according to the present invention is mounted on the receptacle 12 for normally frictionally engaging wheels 14, 16 and restraining wheels 14, 16 from rotation. As will become apparent below, brake arrangement 20 will be set except when grasped by an operator (not shown) of vehicle 10.

Receptacle 12 advantageously has longitudinally spaced end walls 22 and 24, laterally spaced side walls 6 and 28, and a bottom wall 30, all of which walls are advantageously planar as illustrated. Further, receptacle 12 is provided with a lip 32 arranged along at least the upper edges of side walls 26, 28, with lip 32 axially extending around end walls 22 and 24 in the illustrated vehicle 10. As mentioned above, center wheels 14, 16 are laterally spaced beneath bottom wall 30 and adjacent the lower edges of side walls 26, 28, and are arranged substantially mid-way between end walls 22 and 24. As perhaps can best be seen from FIG. 2 of the drawings, the end walls 22, 24 converge toward one another in the direction from lip 32 toward wheels 14, 16 in order to form a receptacle that flares toward the open top thereof.

Vehicle 10 also includes a pair of handles 34 and 36 affixed to, for example, end walls 22 and 24 of receptacle 12. As can be appreciated from the drawings, one handle 34, 36 is associated with a respective one of the end walls 22, 24.

Brake arrangement 20 advantageously, and preferably, includes a substantially rectangular framework 38 arranged about the side walls 26, 28 and end walls 22, 24 of receptacle 12, and resiliently supported from the receptacle 12 by a pair of laterally spaced coiled tension springs 40, 42 and the like. A pair of brake shoes 44, 46, shaped as a shallow V arranged opening downwardly, are mounted on framework 38 for normally frictionally engaging wheels 14, 16. More specifically, the upstanding plates which facilitate attachment of brake shoes 44, 46 to framework 38 themselves form anchors for the adjacent ends of side rails 48 and 50 which make up parts of framework 38; that is, side rails 48, 50 form the portions of framework 38 which extend along, and are substantially parallel to, side walls 26, 28 and receptacle 12. Cross handles 52 and 54 connected together side rails 48, 50 across end walls 22, 24 of receptacle 12 in order to complete framework 38. Since brake arrangement 20 will usually be constructed from a suitable steel, and the like, rails 48, 50, as well as brake shoes 44, 46, may be attached to the upstanding plates and to the cross handles 52 and 54 in a conventional manner, such as by welding.

Vehicle 10 further includes a pair of longitudinally spaced, swiveling wheels 56 and 58 similar to conventional casters, rotatably mounted on end walls 22 and 24 of receptacle 12 as by triangular shaped brackets 60 and 62. One wheel 56, 58 is associated with a respective one of the end walls 22, 24, as perhaps can best be seen from FIG. 2 of the drawings.

Figure 2:
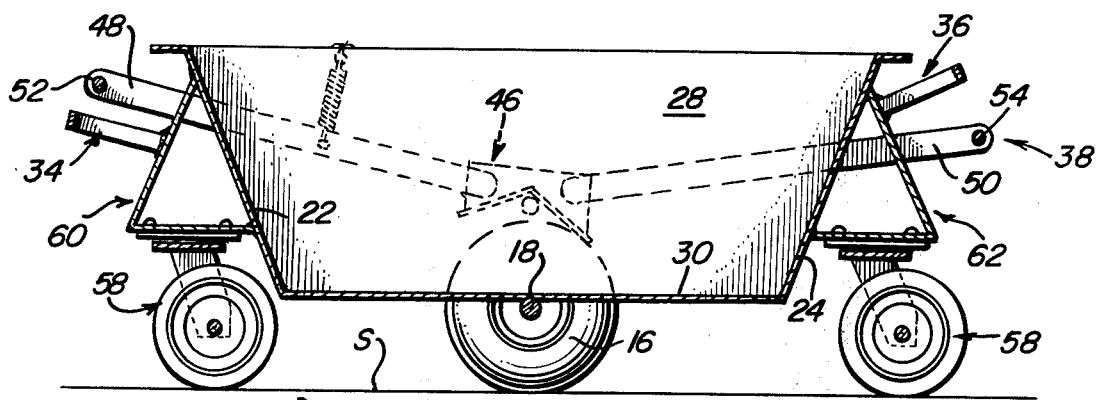
FIG. 2 is a sectional view taken generally along the line 2—2 of FIG. 1.
Figure 3:
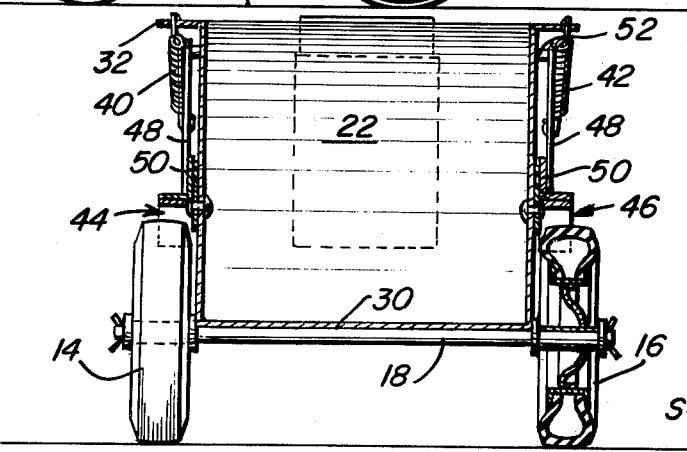
FIG. 3 is a sectional view taken generally along the line 3—3 of FIG. 1.

As can also best be seen from FIG. 2 of the drawings, one end of framework 38, that formed with side rails 48 and cross handle 52, and supported by springs 40, 42, is arranged above its associated affixed handle 34 while the other end of framework 38, that associated with affixed handle 36 and formed by side rails 50 and cross handle 36, is arranged below the associated handle 36. Thus, handle 52 is depressed to release brake shoes 44, 46 from wheels 14, 16, and handle 54 is lifted to effect the release of the brake shoes 44, 46. On both ends, the associated handle 52, 54 is moved until it is in contact with the associated stationary handle 34, 36. This moved position is not shown in the drawings.

As can be readily appreciated from the above description and from the drawings, a brake arrangement 20 according to the present invention forms a novel combination with material handling vehicle 10 in order to achieve a desired deadman braking function in a simple yet rugged and reliable manner conducive for use with mortar carts and similar construction equipment.

The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A material handling vehicle, comprising, in combination:
   a. a load receiving receptacle;
   b. a pair of spaced center wheels rotatably mounted on the receptacle for movably supporting the receptacle; and
   c. brake means mounted on the receptacle for operation from either end of the vehicle and for normally frictionally engaging the center wheels and restraining the center wheels from rotation, and the brake means includes a framework arranged about the receptacle for grasping at either end of the vehicle and resiliently supported from the receptacle by a pair of laterally spaced tension springs arranged adjacent a common end of the receptacle, and said brake means includes a pair of brake shoes mounted on the framework for normally frictionally engaging the center wheels of the vehicle under the tension of said springs and for release thereof by movement of said framework by an operator at either end of the vehicle.

2. A structure as defined in claim 1, wherein the load receiving receptacle has longitudinally spaced end walls, laterally spaced side walls, and a bottom wall, the receptacle being provided with a lip along at least upper edges of the side walls, and the center wheels being laterally spaced beneath the bottom wall and adjacent lower edges of the side walls and arranged substantially mid-way between the end walls.

3. A structure as defined in claim 2, wherein the vehicle further includes a pair of handles affixed to the end walls of the receptacle, one handle to an associated one of the end walls.

4. A structure as defined in claim 3, wherein the vehicle further includes a pair of longitudinally spaced swivelling wheels rotatably mounted on the end walls of the receptacle, one of the swivelling wheels to an associated one of the end walls.

5. A structure as defined in claim 1, wherein the brake means includes a framework arranged about the receptacle and resiliently supported from the receptacle by a pair of laterally spaced tension springs arranged adjacent common end of the receptacle, and a pair of brake shoes mounted on the framework for normally frictionally engaging the center wheels of the vehicle.

6. A material handling vehicle, comprising, in combination:
   a. a load receiving receptacle;
   b. a pair of spaced center wheels rotatably mounted on the receptacle for movably supporting the receptacle; and
   c. brake means mounted on the receptacle for normally frictionally engaging the center wheels and restraining the center wheels from rotation, the load receiving receptacle has longitudinally spaced end walls, laterally spaced side walls, and a bottom wall, the receptacle being provided with a lip along at least upper edges of the side walls, and the center wheels being laterally spaced beneath the bottom wall and adjacent lower edges of the side walls and arranged substantially mid-way between the end walls, the vehicle further includes a pair of handles affixed to the end walls of the receptacle, one handle to an associated one of the end walls, and the brake means includes a substantially rectangular framework arranged about the side and end walls of the receptacle and resiliently supported from the receptacle by a pair of laterally spaced tension springs; a pair of brake shoes mounted on the framework for normally frictionally engaging the center wheels, with the springs being anchored in the lip arranged along respective upper edges of the side walls of the receptacle and adjacent a one of the end walls of the receptacle; and the framework including side rails connected to the brake shoes and forming a shallow V as the side rails extend from the brake shoes toward the end walls of the receptacle, with cross handles connecting together the side rails across the end walls of the receptacle, one of the cross handles being normally arranged beneath its associated handle affixed to the receptacle and the other of the cross handles being normally arranged above its associated handle affixed to the receptacle.

7. A structure as defined in claim 6, wherein the vehicle further includes a pair of longitudinally spaced swivelling wheels rotatably mounted on the end walls of the receptacle, one of the swivelling wheels to an associated one of the end walls.

8. A deadman brake system for use on a material handling vehicle having a plurality of wheels moveably supporting the vehicle, the brake system comprising, in combination:
 a. a framework arranged about a load receiving receptacle of the vehicle for operation from either end of the vehicle;
 b. a pair of spaced tension springs connected to the receptacle and to the framework for resiliently supporting the framework from the receptacle, the springs arranged adjacent a common end of the receptacle; and
 c. a brake shoe mounted on the framework for normally frictionally engaging a one of the wheels movably supporting the vehicle under the tension of said pair of springs and for release thereof by movement of said framework by an operator at either end of the vehicle.

9. A deadman brake system for use on a material handling vehicle having a plurality of wheels moveably supporting the vehicle, the brake system comprising, in combination:
 a. a framework arranged about a load receiving receptacle of the vehicle;
 b. a pair of spaced tension springs connected to the receptacle and to the framework for resiliently supporting the framework from the receptacle, the springs arranged adjacent a common end of the receptacle; and a pair of brake shoes mounted on the framework for normally frictionally engaging wheels supporting the vehicle, and the framework includes side rails connected to the brake shoes and forming a shallow V as they extend from the brake shoes toward longitudinally spaced end walls of the receptacle, with cross handles connecting together the side rails across the end walls of the receptacle, one of the cross handles being arranged above an associated handle affixed to the receptacle adjacent the cross handle, and the other of the cross handles being arranged below an associated handle affixed to the receptacle adjacent the cross handle.

* * * * *

UNITED STATES PATENT OFFICE
CERTIFICATE OF CORRECTION

PATENT NO. : 3,963,258

DATED : June 15, 1976

INVENTOR(S) : GUTHRIE B. STONE, Deceased, ALAN J. STONE and CHRISTIAN T. TERTINEK It is certified that error appears in the above-identified patent and that said Letters Patent are hereby corrected as shown below:

In the heading, page 1, column 1, after line 4, add

--Alan J. Stone, Honeoye, N.Y.;--.

Signed and Sealed this

Thirty-first Day of August 1976

[SEAL]

Attest:

RUTH C. MASON
*Attesting Officer*

C. MARSHALL DANN
*Commissioner of Patents and Trademarks*